(12) United States Patent
Whinnery et al.

(10) Patent No.: US 8,242,736 B2
(45) Date of Patent: Aug. 14, 2012

(54) DC MOTOR WITH DIRECTIONALLY DETERMINED TORQUE

(75) Inventors: Joseph Whinnery, Marysville, OH (US); Dave Peterson, East Liberty, OH (US); Ken Burns, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 297 days.

(21) Appl. No.: 12/062,104

(22) Filed: Apr. 3, 2008

(65) Prior Publication Data
US 2009/0251080 A1 Oct. 8, 2009

(51) Int. Cl.
*H02K 7/00* (2006.01)

(52) U.S. Cl. ........ 318/831; 318/115; 318/491; 318/538; 318/830; 310/191; 310/209

(58) Field of Classification Search .................. 310/191, 310/180, 179, 90, 209; 318/538, 540, 831, 318/115, 491, 830
See application file for complete search history.

(56) References Cited

U.S. PATENT DOCUMENTS

| | | | | |
|---|---|---|---|---|
| 3,817,117 A * | 6/1974 | Kita et al. ........................ 74/462 |
| 4,200,000 A * | 4/1980 | Fluehmann ...................... 74/437 |
| 4,207,777 A * | 6/1980 | Fluehmann ...................... 74/462 |
| 4,284,935 A * | 8/1981 | March et al. .................. 318/280 |
| 4,321,839 A * | 3/1982 | Vuilleumier ...................... 74/462 |
| 4,328,451 A | 5/1982 | Barge |
| 4,618,794 A | 10/1986 | Rampignon |
| 4,652,781 A | 3/1987 | Andrei-Alexandru et al. |
| 4,980,591 A | 12/1990 | Takanashi et al. |
| 5,045,741 A * | 9/1991 | Dvorsky ........................ 310/209 |
| 5,099,706 A * | 3/1992 | Irvin ................................. 74/63 |
| 5,129,272 A * | 7/1992 | Irvin ................................. 74/63 |
| 5,179,990 A * | 1/1993 | Marocco ................. 160/176.1 V |
| 5,345,767 A * | 9/1994 | Ando et al. ...................... 60/721 |
| 5,533,484 A * | 7/1996 | Oppermann et al. .......... 123/358 |
| 5,937,478 A * | 8/1999 | Regnier ............................ 16/78 |
| 6,051,945 A * | 4/2000 | Furukawa ...................... 318/280 |
| 6,107,759 A | 8/2000 | Miller |
| 6,123,533 A * | 9/2000 | McBurnett et al. ............ 418/191 |
| 6,202,794 B1 | 3/2001 | Hakala et al. |
| 6,205,612 B1 * | 3/2001 | Tilli et al. ................... 15/250.16 |
| 6,276,160 B1 * | 8/2001 | Terada et al. .................... 62/353 |
| 6,304,048 B1 * | 10/2001 | Davies et al. ................. 318/475 |
| 6,353,968 B1 * | 3/2002 | Shyu et al. ...................... 16/334 |
| 6,492,753 B2 * | 12/2002 | Zepp et al. ...................... 310/90 |
| 6,498,451 B1 * | 12/2002 | Boules et al. ................. 318/661 |
| 6,504,277 B2 | 1/2003 | Uemura et al. |
| 6,555,941 B1 * | 4/2003 | Zepp et al. ..................... 310/191 |
| 6,563,245 B1 * | 5/2003 | Suzuki et al. ................... 310/91 |
| 6,646,398 B1 * | 11/2003 | Fukazawa et al. ............ 318/445 |
| 6,837,123 B2 * | 1/2005 | Hawkins ......................... 74/457 |
| 6,893,239 B2 * | 5/2005 | Pippes ........................... 418/171 |
| 6,943,478 B2 * | 9/2005 | Zepp et al. ..................... 310/191 |

(Continued)

*Primary Examiner* — Rita Leykin
(74) *Attorney, Agent, or Firm* — Rankin Hill & Clark LLP

(57) ABSTRACT

A device and method for matching the rates of speed at which an electric motor that is drivingly connected to a worm gear raises and lowers a window in an automobile power window assembly. By axially displacing the motor's armature, and/or by varying the thread and tooth profiles of the worm and the gear, the amount of torque produced by the motor and transmitted through the worm gear can be altered. In order to compensate for the effect of gravity on the motor load and on the window's speed of ascent and descent, more torque is provided when the window is being raised and less torque is provided when the window is being lowered.

19 Claims, 4 Drawing Sheets

U.S. PATENT DOCUMENTS

| | | | |
|---|---|---|---|
| 7,042,128 B2 * | 5/2006 | Zepp et al. | 310/191 |
| 7,456,535 B2 * | 11/2008 | Suzuki et al. | 310/90 |
| 7,567,006 B2 * | 7/2009 | Ichiyama | 310/191 |
| 7,671,503 B2 * | 3/2010 | Naito et al. | 310/191 |
| 2004/0221672 A1 * | 11/2004 | Fleytman | 74/425 |
| 2006/0168891 A1 * | 8/2006 | Aoyama et al. | 49/360 |
| 2009/0008887 A1 * | 1/2009 | Buma | 280/5.511 |
| 2010/0000357 A1 * | 1/2010 | Gutmann et al. | 74/462 |

* cited by examiner

DC MOTOR WITH DIRECTIONALLY DETERMINED TORQUE

BACKGROUND OF THE INVENTION

1. Field of the Invention

This invention relates generally to the field of power window systems, and more particularly to devices and methods for maintaining a constant rate of speed at which an electric or other motor raises and lowers an automobile window.

2. Description of the Related Art

In the field of luxury automobiles, a customer's perception of quality is largely based on an automobile's level of refinement. One aspect of refinement centers on whether the operating speed of an automobile's power windows is smooth and consistent when the windows are raised and lowered. A problem common to all automobile power window systems is that the load on a window motor changes depending on whether the motor is pushing the window up or pulling it down. The force of gravity causes the load on the motor to be greater during upward travel than it is during downward travel. If this load inequality is not compensated for, the window will descend at a faster rate than it is able to ascend. This change in speed is much more noticeable with large, heavy pieces of glass such as those used in luxury vehicles.

A DC brush motor, which is commonly used to raise and lower automobile windows, converts electrical energy to mechanical energy by creating a magnetic field that pushes or pulls against permanent magnets on the motor case. The force on a current carrying conductor in a magnetic field is the product of the magnetic field strength and the current in the conductor. This relationship is described by the equation $F = iL \times B$, where F is force, i is the magnitude of the current in the conductor, L is the direction current is traveling in the conductor, and B is magnetic field strength. The standard solution for overcoming the problem of unequal rates of power window ascent and descent has been to use pulse width modulation (PWM) to control the amount of current in a window motor's armature windings. By using PWM to vary the amount of voltage applied to a power window motor, the current flowing through the conductor may be varied and the speed-torque curve of the motor can be shifted up or down. Thus, by increasing the voltage applied to the motor during the upward travel of the window, and decreasing the voltage during the downward travel, the window's rates of ascent and descent can be matched.

It is desirable to have an alternative, mechanical solution to the problem of window motor load variation that does not require the additional electrical components necessary for employing PWM.

BRIEF SUMMARY OF THE INVENTION

It is the purpose of this invention to disclose devices and methods for varying the amount of torque applied to raising and lowering a power window in an automobile for equalizing that window's rates of ascent and descent without the use of additional electrical components. The invention is suitable for any window that has a vertical component of movement, thereby being affected by gravity in one direction but not in the opposite direction.

In accordance with the present invention, there is provided a power window assembly having a motor drivingly connected to a worm gear. The motor contains an armature that is rotatably driven by a magnetic field created by permanent magnets on the motor case. The worm of the worm gear is preferably a rigid, axial extension of the armature that communicates the rotational motion of the armature to the gear, which in turn drives the window up and down through conventional mechanisms.

In one embodiment of the invention, the armature is axially shifted in and out of the magnetic field in order to adjust the torque output of the motor. By shifting the armature partially out of alignment with the magnetic field, fewer of the armature's windings are exposed to the magnetic field, and the amount of torque generated by the motor drops accordingly. Axial displacement of the armature and the worm, which is preferably rigidly attached to the armature, is achieved by application of axial thrust forces to the armature and the worm that are generated by the gearing relationship between the worm and the gear.

When the window is being lowered, gravity assists the motor in pulling the window down, thereby obviating the need for maximum torque output. Therefore, the armature is shifted partially out of alignment with the magnetic field during downward travel. Conversely, when the window is being raised, and the load on the motor is increased relative to when the window is being lowered, due to the force of gravity resisting upward movement of the window, the armature preferably shifts into full alignment with the magnetic field to increase torque production. By varying the degree to which the armature is displaced when the window is lowered, a motor can be tailored to a particular window so that the window is raised and lowered at similar speeds.

In another embodiment of the invention, the torque provided for raising and lowering the window is varied by using a gear having an asymmetrical tooth profile. By forming the gear teeth with one side of each tooth having a greater pitch than the opposite side of the tooth, the efficiency of the gear varies depending on whether it is rotating clockwise or counterclockwise.

In order to compensate for the force of gravity, the gear is preferably oriented within the power window assembly to transmit torque more efficiently when rotating to raise the window and less efficiently when rotating to lower the window. By varying the tooth profile, a gear can be tailored to a particular window in order that the window ascends and descends at similar speeds.

In yet another embodiment of the invention, the torque provided for raising and lowering the window is varied by the incorporation of a worm having an asymmetrical thread profile. By forming the threads of the worm with one side of each thread having a greater pitch than the opposite side of the thread, the efficiency of the worm varies depending on whether it is rotating clockwise or counterclockwise. Similar to the asymmetrical tooth embodiment described above, the thread profile can be tailored to a particular window in order that the window ascends and descends at similar speeds.

Figure 1A:
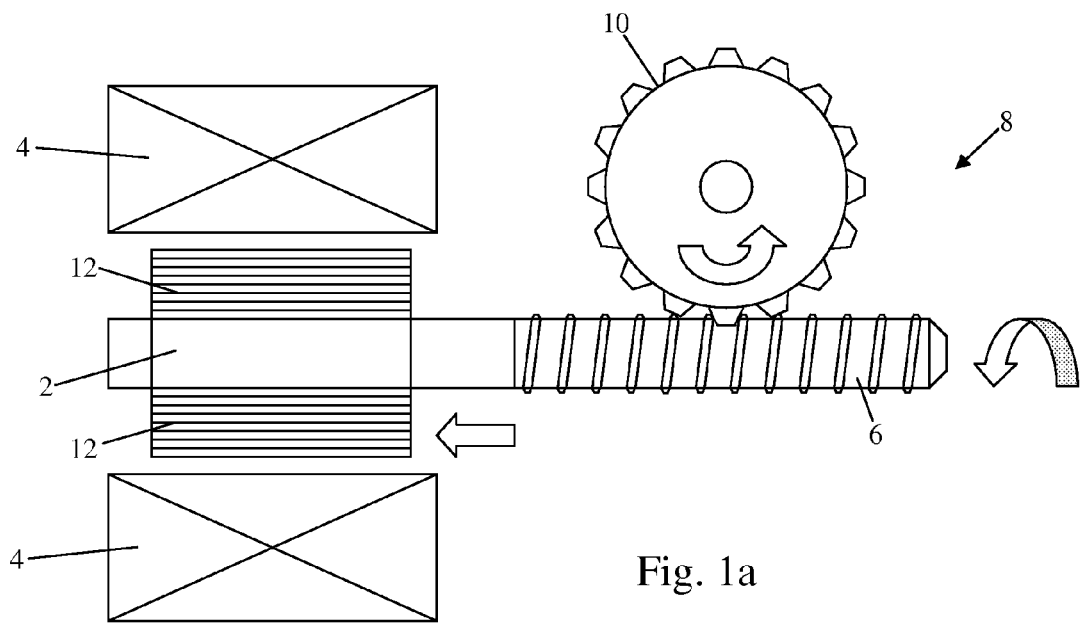
FIG. 1a is a schematic side view illustrating an embodiment of the present invention when operating to raise a window.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

Figure 1B:
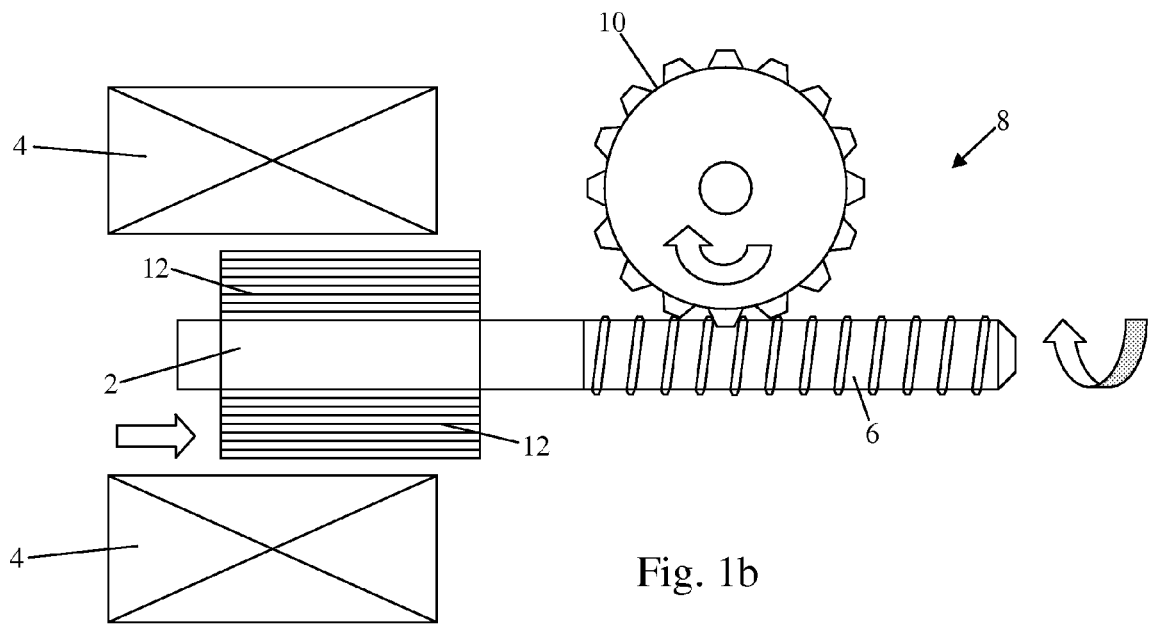
FIG. 1b is a schematic side view illustrating the embodiment of the present invention shown in FIG. 1a when operating to lower a window.

The embodiment of the invention shown in FIGS. 1a and 1b is incorporated into an automobile electric window motor assembly, which is preferably a dc brush motor containing an armature 2 that rotates within a magnetic field created by permanent magnets 4 on the motor case. The armature 2 is rigidly connected to the worm 6 of a worm gear 8. Because of the gearing relationship between the armature 2, the worm 6 and the cooperating gear 10, this type of assembly generates an axial thrust force (along the axis of the arrow of FIG. 1a) on the worm 6 and the armature 2, causing them to push against the motor case when rotating in one direction, and to push against the gear housing when rotating in the opposite direction, as shown in FIG. 1b.

The critical feature of the embodiment of the invention shown in FIGS. 1a and 1b is that the armature 2 and the worm 6 are free to travel a short distance back and forth along a line defined by their shared axis. This can result from a gap being formed between the components of the motor, or a spring structure permitting such axial movement. By allowing the armature 2 and the worm 6 to shift several millimeters (in one example) along that line, the armature windings 12 can be displaced relative to the permanent magnets 4, thereby altering the alignment between the armature windings 12 and the magnetic field of the permanent magnets 4. This change in alignment results in a change in torque, as described below.

When a car's power window is being lowered, the amount of torque produced by the motor must be less than when it is being raised in order for the window's rates of ascent and descent to match. Referring to FIG. 1b, a reduction in torque is achieved by allowing the axial thrust force discussed above to move the armature 2, and, thereby, shift the armature windings 12 partially outside of the magnetic field when the window is being lowered as shown by the arrow in FIG. 1b. The amount of shift is exaggerated in FIG. 1b for illustrative purposes. This reduction in alignment between the windings 12 and the field increases the reluctance in the motor's magnetic circuit, resulting in decreased torque production and less force pulling the window down than the motor would generate with the windings 12 fully aligned with the magnetic field (as in FIG. 1a). By decreasing the force pulling the window down to the desired degree, the rate of window descent can be matched to the rate of ascent.

Referring back to FIG. 1a, when the motor is driven in the "up" direction, the armature 2 is thrust in the opposite axial direction, thereby shifting the armature windings 12 into full alignment with the magnetic field. Greater exposure of the windings 12 to the field results in an increase in the motor's torque output. The result is that the window is more forcefully pushed upwardly in order to overcome the downward force of gravity. By varying the degree to which the armature 2 is displaced relative to the permanent magnets 4, a motor can be tailored to suit a specific load profile. Generally, for the same motor, the heavier a particular window is, the greater the degree of armature 2 displacement necessary to match the rates of descent and ascent for that window.

In an alternative embodiment of the invention, the amount of torque applied to raising and lowering a window is varied by modifying the gearing arrangement in the power window assembly. Referring to FIGS. 2a-3b, the profile of each tooth 20 of the gear 22 is asymmetrical in the manner of a conventional asymmetrical gear. That is, the pitch of one side 24 of each tooth 20 is greater with respect to the gear wheel 26 than the pitch of the opposite side 28 of each tooth 20. The horizontal and vertical components of the force imparted to the gear 22 by the worm 30 thus vary depending upon the direction in which the worm 30 is driving the gear 22. This is best illustrated in the exploded views of the threads 32 of the worm 30 and the teeth 20 of the gear 22 shown in FIGS. 3a and 3b, wherein the lengths of the vectors V and H represent the relative magnitudes of the vertical and horizontal forces imparted by the threads 32 to the teeth 20. Horizontal and vertical refer to the orientation in the figures as shown.

Figure 2A:
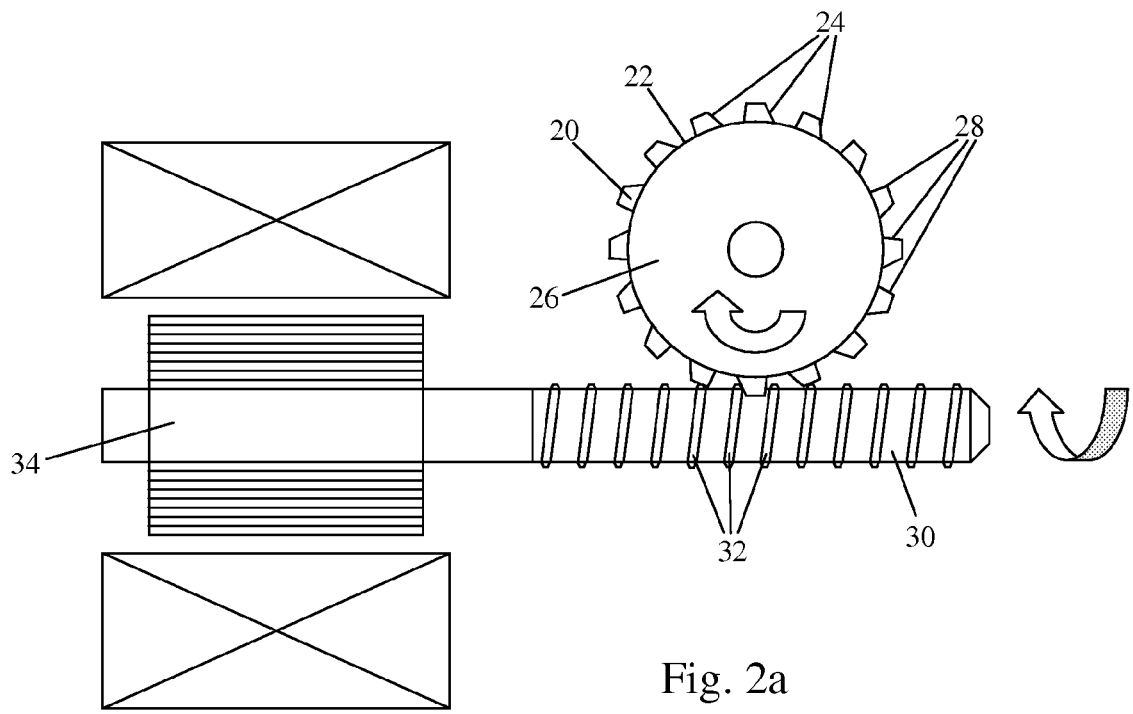
FIG. 2a is a schematic side view illustrating an alternative embodiment of the present invention when operating to raise a window.
Figure 2B:
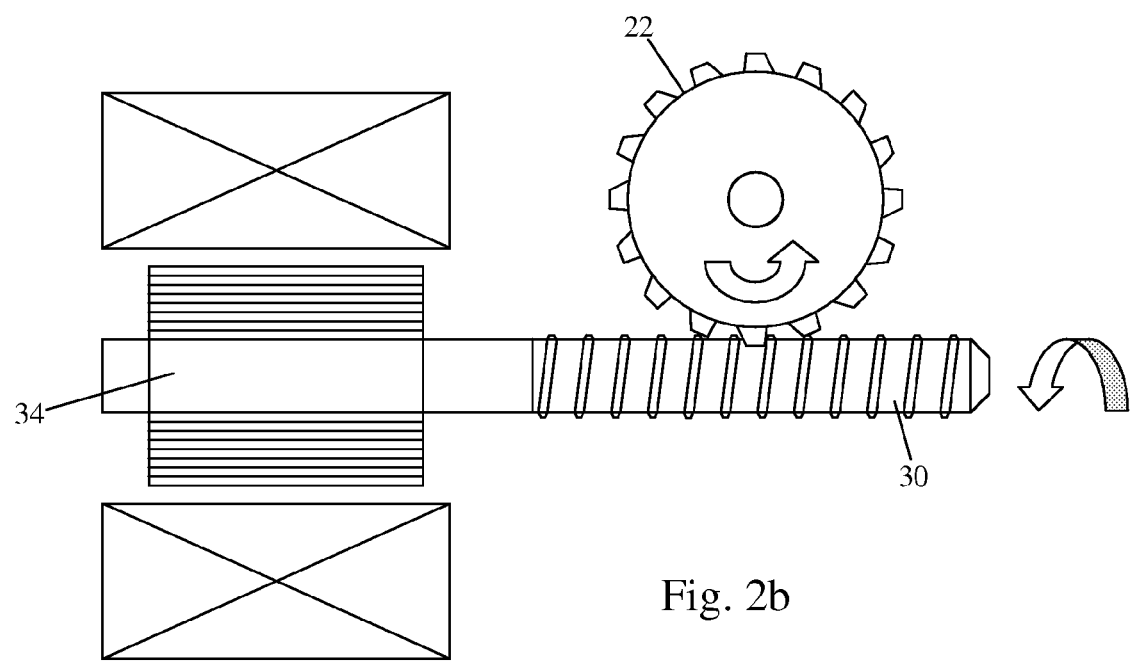
FIG. 2b is a schematic side view illustrating the alternative embodiment of the present invention shown in FIG. 2a when operating to lower a window.
Figure 3A:
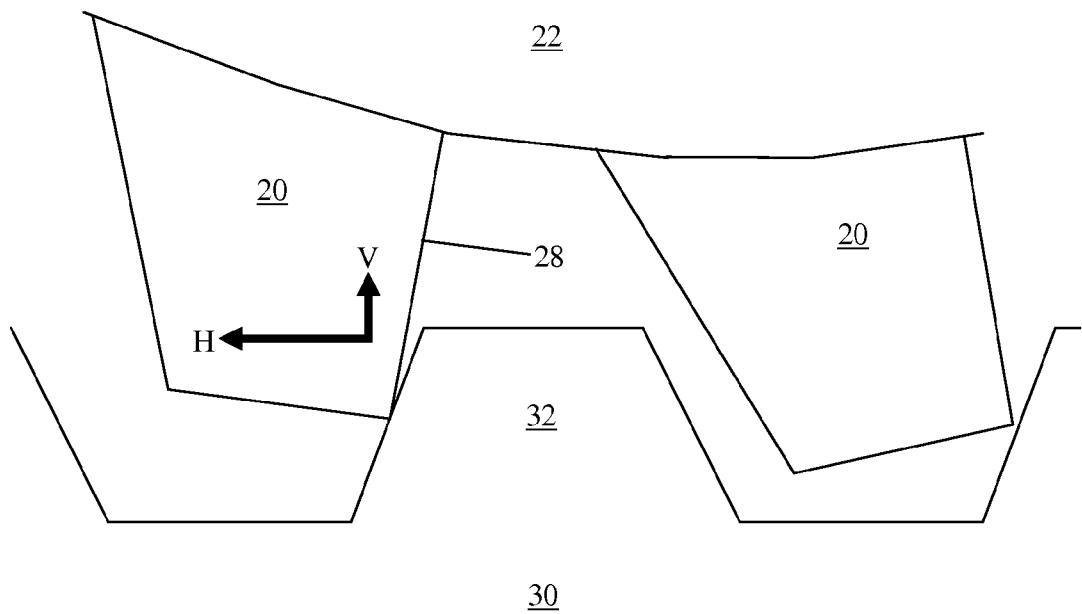
FIG. 3a is an exploded side view illustrating the engagement between the gear and the worm of the alternative embodiment of the present invention shown in FIG. 2a when operating to raise a window.
Figure 3B:
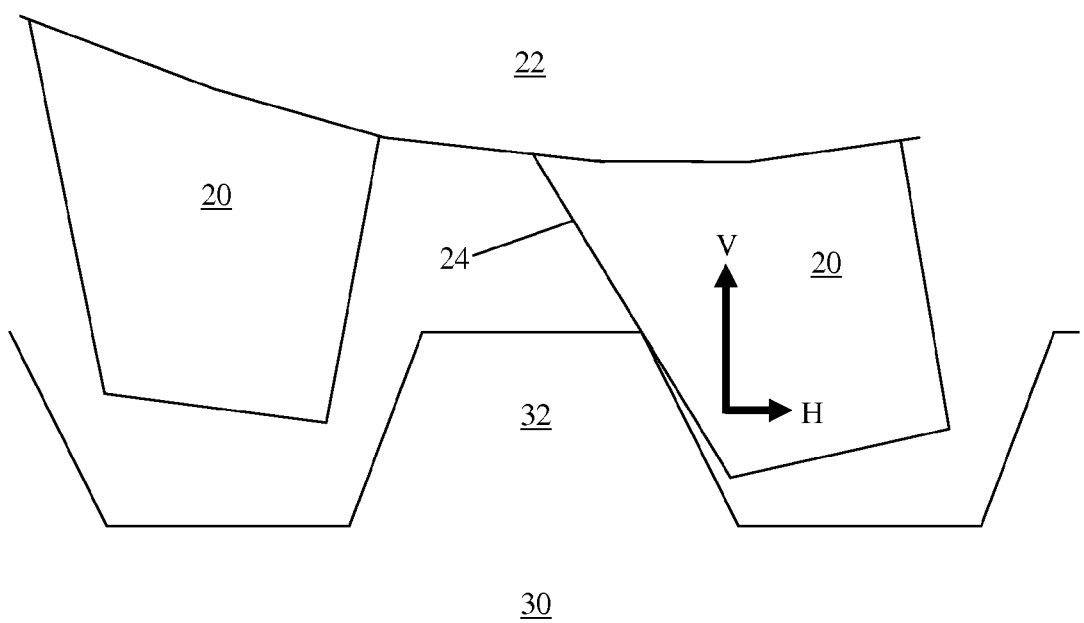
FIG. 3b is an exploded side view illustrating the engagement between the gear and the worm of the alternative embodiment of the present invention shown in FIG. 2b when operating to lower a window.

In FIGS. 2a and 3a, the gear 22 and the worm 30 are rotating in the clockwise direction, when viewed from the front and the right end, respectively, and the worm 30 is engaging the sides 28 of teeth 20 that have the lesser pitch. The horizontal component of the force imparted to the gear 22 is thus greater than the vertical component. In FIGS. 2b and 3b, the worm 30 and the gear 22 are rotating in the counterclockwise direction, when viewed from the front and the right end, respectively, and the worm 30 is engaging the sides 24 of teeth 20 that have the greater pitch. The horizontal component of the force imparted to the gear is thus lesser than the vertical component.

The result of this disparity in pitch is that the efficiency of the gear 22 is greater when the worm 30 turns clockwise (as shown in FIGS. 2a and 3a) as compared to when it turns counterclockwise (as shown in FIGS. 2b and 3b). This approach does not change the fundamental torque production of the armature (as in the embodiment of the invention described above), but changes the efficiency of torque transferred through the gearing.

Although a dc brush motor has been described and shown as the driving means for the gear 22, those skilled in the art will appreciate that all other suitable driving means, such as various other rotary motors, can alternatively be used to drive the asymmetrical gear 22 while still achieving the same directionally-dependent torque efficiency described.

Figure 4A:
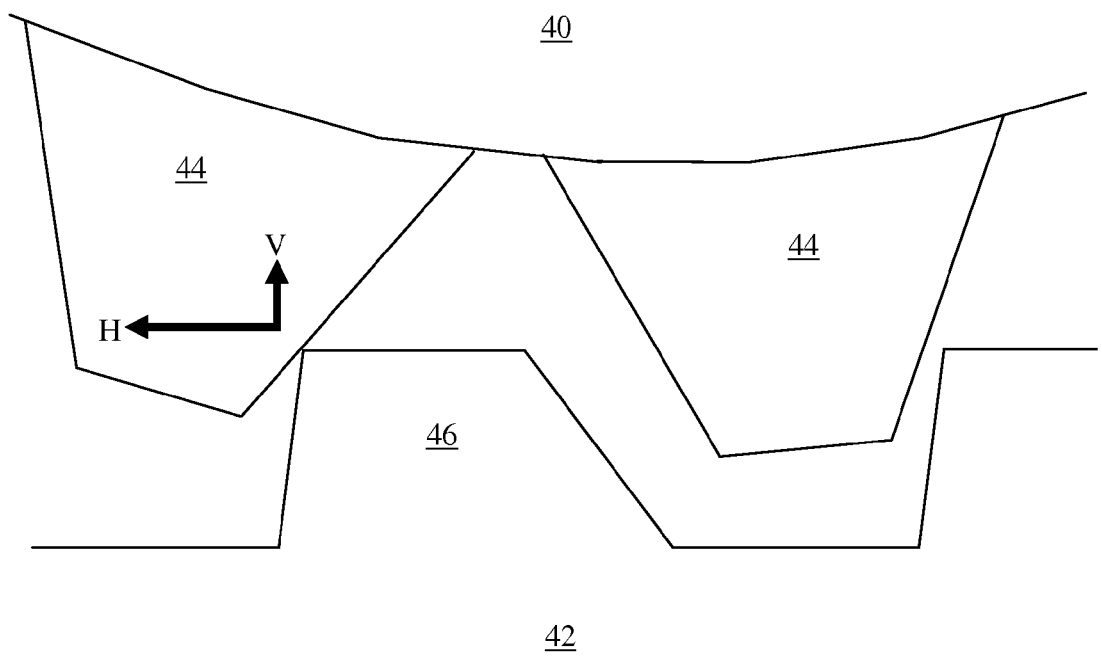
FIG. 4a is an exploded side view illustrating the engagement between the gear and the worm of an alternative embodiment of the present invention when operating to raise a window.
Figure 4B:
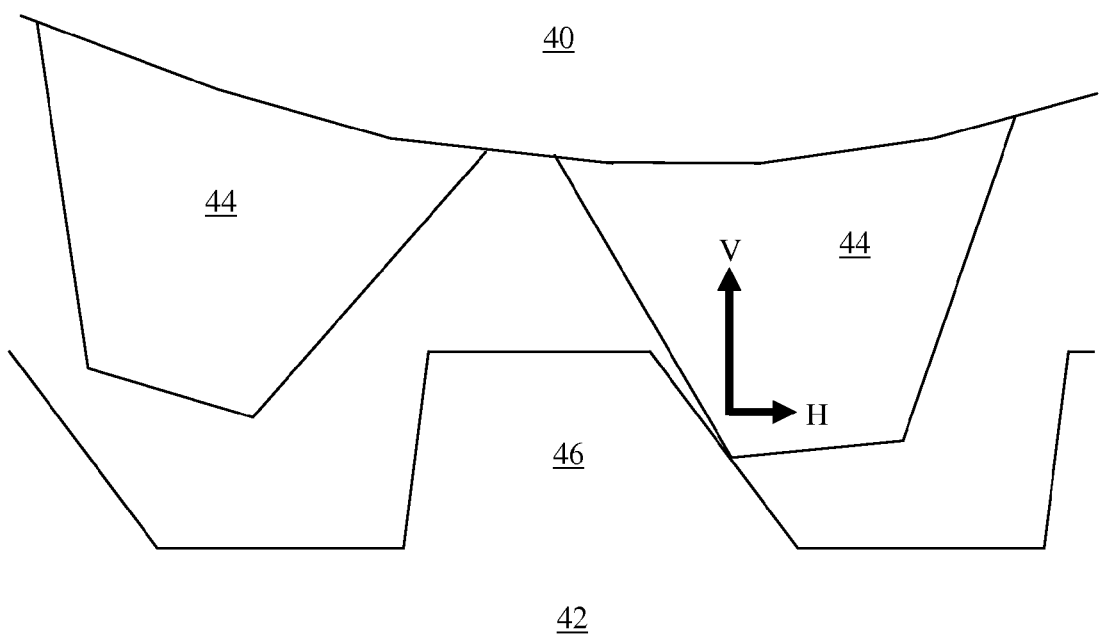
FIG. 4b is an exploded side view illustrating the engagement between the gear and the worm of an alternative embodiment of the present invention when operating to lower a window.

Referring to the exploded views of the gear 40 and the worm 42 shown in FIGS. 4a and 4b, it is contemplated that the teeth 44 of the gear 40 may alternatively be symmetrical (i.e., having the same pitch on both sides), and that the threads 46 of the worm 42 may instead be asymmetrical, thus achieving the same directionally-dependant efficiency relationship described above. In another alternative, an embodiment of the worm gear is contemplated wherein both the gear teeth and the threads of the worm are asymmetrical (not pictured).

Referring back to FIGS. 2a and 2b, the gear 22 is oriented deliberately within the power window assembly in order that the worm 30 engages the sides 28 of the gear teeth 20 having a lesser pitch when the worm 30 rotates to raise the window, and engages the sides 24 of the teeth 20 having a greater pitch when the worm 30 rotates to lower the window. Therefore, the gear 22 will receive torque from its cooperating worm 30 more efficiently when the window is being raised and less efficiently when it is being lowered. The additional torque efficiency provided during upward travel of the window compensates for the additional load placed on the motor due to gravity. By tailoring the gear tooth profile to a specific window, the gear 22 is able to transfer the desired torque to raise and lower the window at the same rate despite the different motor load. Generally, the heavier the window, the greater the disparity in pitch that will be necessary.

It is contemplated that the embodiments of the invention described above may be combined to form alternative, hybrid embodiments of the invention that incorporate features that have heretofore been discussed only in separate embodiments. For example, an embodiment is contemplated that incorporates variable armature alignment as well as an asymmetrical gear tooth profile. Alternatively, the window motor assembly can incorporate variable armature alignment as well as an asymmetrical thread profile on the worm.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An improved power window assembly for an automobile having an electric motor drivingly connected to a window, the electric motor having an armature rotatably driven about an axis by a magnetic field, the improvement comprising means for axially displacing the armature to change an alignment with the magnetic field wherein the armature and the electric field are arranged such that displacing the armature to change the alignment with the magnetic field alters torque produced by the motor, and
   wherein the armature is configured to be axially displaced to a first position in which at least part of the armature is outside of the magnetic field when the window is being lowered, and wherein the armature is configured to be axially displaced to a second position in which more of the armature is within the magnetic field when the window is being raised.

2. An improved power window assembly for an automobile having a window driven by a rotary motor, the motor containing an armature rotatably driven by a magnetic field, the armature driving a worm gear having a plurality of gear teeth, the improvement comprising asymmetrical gear teeth for transferring torque from the worm gear more efficiently when rotating the worm gear in one direction and less efficiently when rotating the worm gear in an opposite direction.

3. An improved power window assembly for an automobile having a window driven by a rotary motor, the motor containing an armature rotatably driven by a magnetic field, the armature driving a worm gear with a worm having a plurality of threads, the improvement comprising asymmetrical worm threads for driving a cooperating gear more efficiently when rotating the worm in one direction and less efficiently when rotating the worm in an opposite direction.

4. A method for matching the rates of ascent and descent of a window in a power window assembly of an automobile, the method comprising:
   providing the assembly having an electric motor drivingly connected to the window, the electric motor having an armature at least partially aligned with, and rotatably driven by, a magnetic field;
   displacing the armature axially to change its alignment with the magnetic field; and
   altering torque production by the motor when the armature is displaced axially for matching the rates of ascent and descent of the window.

5. The method of claim 4, further comprising a step of displacing the armature axially to a first position when the window is being lowered in which at least part of the armature is outside of the magnetic field.

6. The method of claim 5, wherein the step of displacing the armature further comprises generating an axial thrust force on the armature by a gearing relationship between the armature and at least one output gear, and wherein the axial direction of said thrust force is determined by a rotational direction of the armature.

7. The method of claim 5, further comprising a step of displacing the armature axially to a second position when the window is being raised in which more of the armature is within the magnetic field than when the armature is in the first position.

8. A method for matching the rates of ascent and descent of a window in a power window assembly of an automobile, the assembly having an electric motor drivingly connected to the window, the electric motor having an armature at least partially aligned with, and rotatably driven by, a magnetic field, the armature driving a worm gear which in turn drives a cooperating gear, the cooperating gear having a plurality of teeth, the method comprising:
   (a) displacing the armature axially to decrease alignment with the magnetic field when the gear rotates to lower the window, and wherein decreasing alignment with the magnetic field alters a torque produced by the motor; and
   (b) disposing asymmetric teeth on the cooperating gear to more efficiently drive the cooperating gear with the worm gear when the worm gear rotates to raise the window and less efficiently drive the gear with the worm gear when the worm gear rotates to lower the window.

9. The method of claim 8, further comprising a step of displacing the armature axially to increase alignment with the magnetic field when the worm gear rotates to raise the window.

10. The method of claim 8, wherein axial displacement of the armature is driven by an axial thrust force on the armature generated by a gearing relationship between the armature and the cooperating gear, and wherein the axial direction of said thrust force is determined by a rotational direction of the armature.

11. A method for matching the rates of ascent and descent of a window in a power window assembly of an automobile, the assembly having an electric motor drivingly connected to the window, the electric motor having an armature at least partially aligned with, and rotatably driven by, a magnetic field, the armature driving a worm gear, a worm of the worm gear having a plurality of threads, the method comprising:

(a) displacing the armature axially to decrease alignment with the magnetic field when the worm rotates to lower the window, and wherein decreasing alignment with the magnetic field reduces torque supplied by the motor; and (b) disposing asymmetric threads on the worm to more efficiently drive the gear when the gear rotates to raise the window and less efficiently when the gear rotates to lower the window.

12. The method of claim 11, further comprising a step of displacing the armature axially to increase alignment with the magnetic field when the worm rotates to raise the window.

13. The method of claim 11, wherein axial displacement of the armature is driven by an axial thrust force on the armature generated by a gearing relationship between the armature and at least one output gear, and wherein the axial direction of said thrust force is determined by a rotational direction of the armature.

14. An improved power window assembly for an automobile having an electric motor drivingly connected to a window, the electric motor having an armature rotatably driven about an axis by a magnetic field, the improvement comprising means for axially displacing the armature to change an alignment with the magnetic field wherein the armature and the electric field are arranged such that displacing the armature to change the alignment with the magnetic field alters torque produced by the motor, wherein the means for axially displacing the armature to change the alignment with the magnetic field includes provision of a gap at an axial end of the armature that allows axial displacement of the armature due to an axial thrust force generated between a worm gear driven by the armature and a cooperating gear.

15. A power window assembly for a vehicle, comprising:
an electric motor drivingly connected to a window, the electric motor having an armature rotatably driven about an axis by a magnetic field;
a worm gear driven by the armature, the worm gear having a worm thread; and
a cooperating gear having gear teeth meshingly engaged with the worm thread such that driving of the worm gear drives the cooperating gear, wherein at least one of the armature, the magnetic field, the worm gear and the cooperating gear are configured to provide a first torque to the cooperating gear when the armature is rotated in a first direction and to provide a second torque to the cooperating gear when the armature is rotated in a second, opposite direction, the second torque mechanically reduced relative to the first torque.

16. The power window assembly of claim 15, wherein the armature and the magnetic field are arranged such that the armature is axially shifted in a first direction when driven in the first rotatable direction and axially shifted in a second direction when driven in the second rotatable direction, axially shifting of the armature moves the armature relative to the magnetic field such that the magnetic field provides an increased or decreased magnetic force on the armature depending on the axial position of the armature.

17. The power window assembly of claim 16, wherein at least one of the worm thread of the worm gear and the gear teeth of the cooperating gear are asymmetrically configured to more efficiently transfer torque to the cooperating gear when the armature is driven in the first rotatable direction and less efficiently transfer torque to the cooperating gear when the armature is driven in the second rotatable direction.

18. The power window assembly of claim 15, wherein at least one of the worm thread of the worm gear and the gear teeth of the cooperating gear are asymmetrically configured to more efficiently transfer torque to the cooperating gear when the armature is driven in the first rotatable direction and less efficiently transfer torque to the cooperating gear when the armature is driven in the second rotatable direction.

19. The power window assembly of claim 18, wherein asymmetrically configured includes having a first pitch side and a second pitch side, wherein the first pitch side has a different pitch than the second pitch side.

* * * * *